Feb. 14, 1961 S. J. LAPPORTE ET AL 2,971,989
PRODUCTION OF ALPHA-GLYCOLS
Filed March 21, 1958
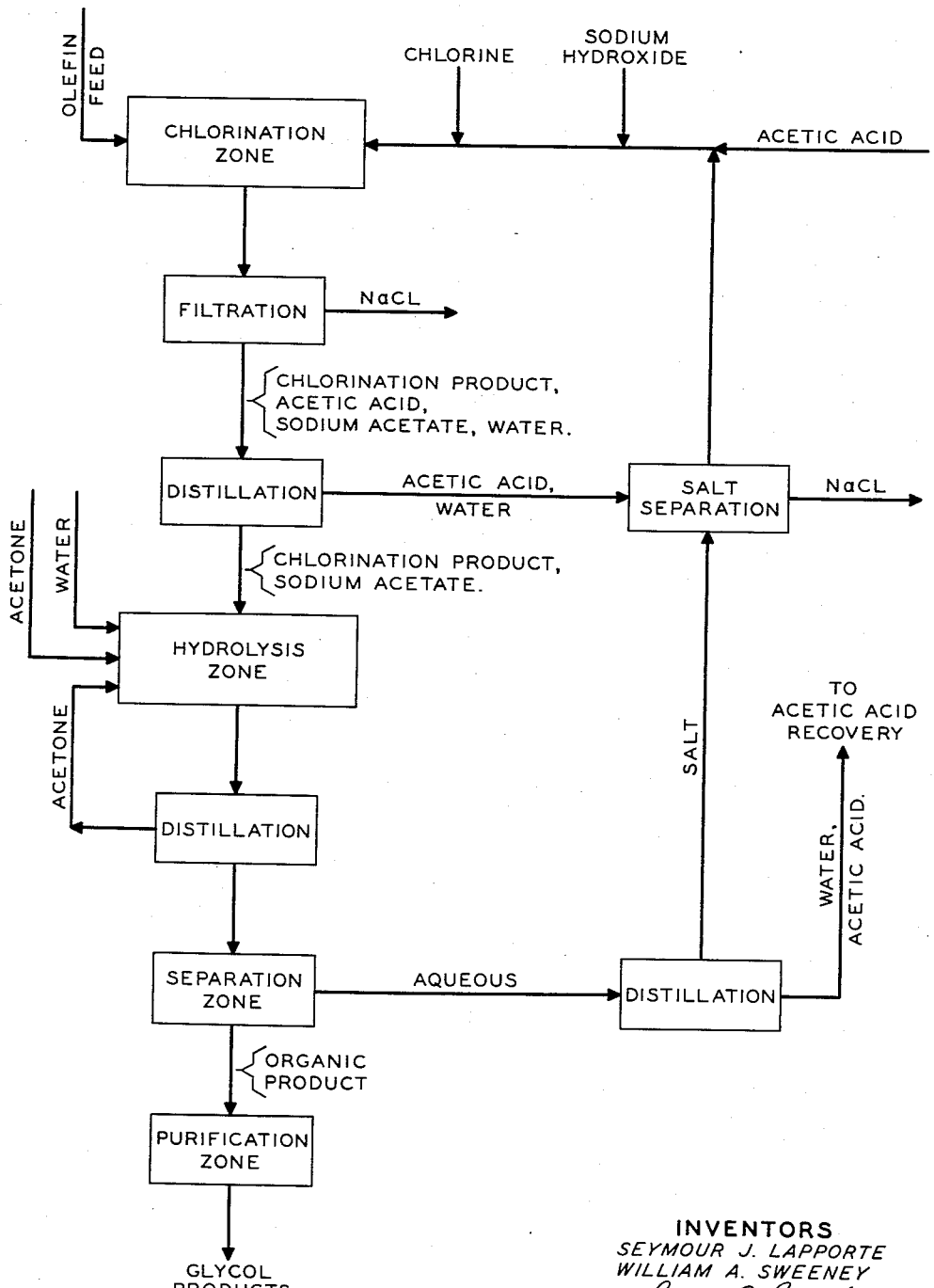
INVENTORS
SEYMOUR J. LAPPORTE
WILLIAM A. SWEENEY
BY
ATTORNEYS

United States Patent Office 2,971,989
Patented Feb. 14, 1961

2,971,989
PRODUCTION OF ALPHA-GLYCOLS

Seymour J. Lapporte, Berkeley, and William A. Sweeney, San Rafael, Calif., assignors to California Research Corporation, San Francisco, Calif., a corporation of Delaware Filed Mar. 21, 1958, Ser. No. 722,995

6 Claims. (Cl. 260—636)

The present invention relates to the preparation of 1,2-glycols having 5 to 20 carbon atoms in the molecule. More particularly, the invention has to do with a process for the preparation of such glycols involving the chloroacetoxylation of an appropriate mono unsaturated 1-olefin and hydrolysis under special conditions.

Alpha-glycols are important intermediates in chemical synthesis such as in the preparation of detergents, in cutting oil emulsions, in surface coating alkyds, etc.

Various methods are available for the preparation of α-glycols, but none of these is satisfactory for the commercial production of alpha-glycols of high molecular weight, that is, those having 5 to 20 carbon atoms in the molecule. Accordingly, the principal object of the invention is to provide a method for the preparation of higher molecular weight glycols, which is economic and commercially feasible.

The invention is primarily based on a two-step process involving the chlorination of the appropriate olefin under such conditions to minimize undesirable chlorine-substituted products, followed by hydrolysis of the resulting product under such conditions to facilitate hydrolysis of the first-step products to the desired α-glycols.

To elaborate, the chlorination of α-olefins gives rise to a number of substituted products. For example, chlorination of dodecene-1 at 100% conversion included 43% 1,2 dichlorododecane, 37% trichloride, and other substitution reaction polychlorides. This was true even though an inhibitor, chloranil, for the free radical reaction was employed. Even at lower olefin conversions the yield of polysubstituted chlorides, other than the dichloride, remain high. Accordingly, it is desirable to have a process which would result in a maximum addition to the double bond of the olefin and the exclusion of those substitution reaction products which cannot yield the desired glycols.

It has also been found that in the hydrolysis of the materials formed in the first step, the 1,2-dichloroalkanes are not readily hydrolyzable by conventional methods. Thus, while it is known in the art that hydrolysis of primary and secondary aliphatic monochlorides with mild bases, such as sodium carbonate and sodium bicarbonate, and the like, gives high yields of alcohols, hydrolysis of 1,2-dichloroaliphatic hydrocarbons under like conditions and reagents does not give a high yield of α-glycols. It was found that hydrolysis of 1,2-dichlorododecane using an equivalent of 1.17 of $Na_2CO_3$ and of $NaHCO_3$ in 60% aqueous acetone at 220° C. gave a glycol yield, respectively, of only 4.4% and 6.0%.

Broadly, the present invention is based on a two-step process involving, first, the chlorination of the appropriate olefin under chlorination conditions in the presence of an acetate ion-donating solvent, e.g., acetic acid or acetic anhydride. In this first step there are formed the chlorohydrin acetate, the diacetate of the olefin and the dichloride by addition of chlorine to the double bond. As is known, the chlorohydrin acetate and the diacetate are readily hydrolyzable to the glycol. Accordingly, the hydrolysis step is performed employing aqueous acetone and acetate salts, whereby the diacetate and chlorohydrin acetate are converted into the glycol quantitatively and the dichloride in yields of 60% or better. In short, the process of the invention involves the production of readily hydrolyzable diacetate and chlorohydrin acetate, a minimum of more difficultly hydrolyzable dichloride, and substantially no undesirable polychlorides; followed by a hydrolysis step which converts the dichloride content of the first-stage products into the α-glycol in high yields.

More specifically, chlorination of the olefin can be effected by contacting under chlorination temperatures olefin and chlorine in stoichiometric amounts, the olefin being dissolved in an acetate ion-donating medium, e.g., acetic acid, in an amount of 0.01 to 0.10 mol of olefin per mol of acetic acid, which may be anhydrous or aqueous, i.e., containing 0–20% water, a satisfactory chlorination temperature range moreover being 10–30° C. The chloroacetoxylation products resulting from the chlorination step, including the olefin dichloride, the chlorohydrin acetate and the diacetate, are then subjected to a hydrolysis step in a confined zone and heated to an elevated temperature in the presence of an organic solvent and an acetate salt, e.g., sodium or potassium acetate, the organic solvent being a cosolvent for the first stage crude mixture comprising water, the base, and the product glycol. The cosolvent which may be aqueous acetone or dioxane, methyl ethyl ketone or tetrahydrofuran having water present in an amount of 10 to 50% by volume preferably around 30%, together with the first stage products, are heated under autogenous pressures, which may range from about 400 to 1000 p.s.i.g., and at elevated temperatures of 200°–250° C., preferably 220°–230° C., in the presence of acetate salt, e.g., sodium or potassium acetate, in amounts of about 2 mols per mol of olefin charged in the chloroacetoxylation step. The top limit of acetate salt is not critical, and 4 mols of sodium acetate per mol of olefin can be cited as a satisfactory top limit. Hydrolysis is usually complete in about 0.5 to 2½ hours, usually around 1 to 2 hours.

In a preferred embodiment of the invention, the chlorination reaction is carried out in a medium comprising acetic acid solvent containing 0–20%, preferably 1–15%, water, and in addition sodium acetate, a portion of which can be obtained by recycle from the hydrolysis step. In this embodiment of the invention the acetic acid is present in an amount by mols of 10 to 100 mols, preferably 25 to 75 per mol of olefin, and the sodium acetate in the amount of 1 to 7, preferably 2 to 5 mols, for each mol of olefin. The chlorine in an amount of about 1 mole per mol of olefin is contacted with the olefin, so as to keep the chlorine concentration very low, at low temperatures, e.g., 10–25° C. Slow addition of the chlorine and/or vigorous stirring of the reaction mixture and/or dilution of the chlorine gas stream with an inert gas such as nitrogen are all helpful in minimizing the production of 1,2-dichloralkane. The use of an aqueous acetic acid solution containing sodium acetate and the carrying out of the reaction in the manner described serves substantially selectively to chlorinate the double bond, and to give a reaction product mixture which can be hydrolyzed, as aforesaid, with from 3 to 15, preferably 5 to 10 parts by weight of cosolvent per part of reaction product mixture, to yield glycols in high yields.

In order to illustrate the practice of a preferred embodiment of the invention, reference is made to the accompanying drawing which is a schematic block diagram showing the chloroacetoxylation zone and the hydrolysis zone with recycle of sodium acetate and acetic acid to the chlorination zone.

Referring now to the drawing, olefin feed, chlorine, sodium hydroxide and acetic acid are introduced into the chlorination zone in amounts and under conditions as aforesaid, to produce a reaction product mixture consisting essentially of chlorohydrin acetate, 1,2-dichloroalkane, the diacetate of the olefin charge, and by-product sodium chloride. Insoluble sodium chloride is removed from the reaction product mixture, as by filtration, and the liquid product mixture introduced into a fractionation zone, acetic acid and water are removed, and the acetic acid eventually recycled to the chlorination zone. The essentially sodium chloride-free chlorination product mixture containing sodium acetate is introduced into the hydrolysis zone, and subjected to hydrolysis as aforesaid. Following hydrolysis the hydrolysis reaction product mixture is subjected to fractionation whereby acetone is separated and recycled to the hydrolysis zone. The acetone-free products including product glycol, acetic acid, sodium acetate, and sodium chloride, are then sent to a separation zone, wherein the product glycol is isolated from the mixture, such as by extraction with a suitable solvent, e.g., pentane, whereupon a water-insoluble layer and an aqueous layer, minus the product glycol are formed. The two layers are separated, the water-insoluble layer being treated to recover glycol, and the glycol further purified if desired. The aqueous layer from the separation zone is then treated to remove water and acetic acid, which latter can then be sent to acetic acid storage. The salts remaining following the removal of acetic acid and water are then transferred to a salt separation zone wherein they are mixed with acetic acid and water present in the chlorination zone prior to the hydrolysis treatment. In the salt separation zone, insoluble sodium chloride is removed, and the remaining products, including acetic acid and sodium acetate, returned to the chlorination zone, together with any required make-up of reagents.

*Example I*

Chlorine was passed into a rapidly stirred solution of 33.7 g. (0.20 mol) dodecene-1, 49.2 g. (0.6 mol) sodium acetate and 511 ml. of 98% aqueous acetic acid at such a rate so as to maintain the temperature between 18° C. and 23° C. The acetic acid was distilled off, the residual salts filtered and the crude chlorination product hydrolyzed by heating in a stirred autoclave at 220° C. for 2 hours with 38.3 g. (0.467 mol) of sodium acetate and 480 ml. of 60 volume percent aqueous acetone. The acetone was distilled off and the organic products separated from the aqueous salts by ether extraction. The ether extracts were washed with saturated sodium bicarbonate, dried with magnesium sulphate and the solvent removed. Distillation of the residual solid gave 29.8 g. of 1,2-dihydroxydodecane (73.7% yield). This represents a 78.5% yield normalized to 100% recovery of products.

*Example II*

A $C_{15}$ α-olefin derived from the cracking of petroleum wax was hydroxylated by passing chlorine into a mixture of 42 g. (0.20 mol) of olefin, 81.7 g. (0.6 mol) of sodium acetate trihydrate and 500 ml. of glacial acetic acid at 23° to 25° C. The crude chlorination product was hydrolyzed by heating in a stirred autoclave at 220° C. for 2 hours with 0.467 mol of sodium acetate in 600 ml. of 70 volume percent aqueous acetone. The product, worked up as in Example I, was isolated in 65% yield. A portion, recrystallized from pentane gave white plates, melting point 64.3 to 65.0° C. which analyzed as follows:

|  | Found | Theory |
| --- | --- | --- |
| Percent Carbon | 73.73 | 73.71 |
| Percent Hydrogen | 13.02 | 13.20 |

*Example III*

A $C_{17}$–$C_{18}$ cracked wax olefin mixture, 50 g., was chlorinated with 1.81 mols of sodium acetate in 90 volume percent aqueous acetic acid at a rate so as to maintain the temperature between 20° and 23° C. The acetic acid was distilled off, the salts separated and the chlorinated product submitted to hydrolysis with 109.5 g. (0.8 mol) of sodium acetate trihydrate in 958 ml. of 73 volume percent aqueous acetone at 220° C. for 2 hours. Isolation of the product as in Example II gave 61.5 g. of solid product.

*Example IV*

The procedure of Example III was repeated using 50 g. of a $C_{19}$–$C_{20}$ cracked wax olefin fraction. The chlorination was carried out at 14° C. to 19° C. Hydrolysis as in the previous example gave 75.5 g. of solid glycol product.

We claim:

1. Process for preparing a 1,2-glycol having 5 to 20 carbon atoms in the molecule, which comprises reacting approximately equimolecular quantities of chlorine and a $C_5$–$C_{20}$ 1-olefin in the presence, for each mol of olefin, of 10 to 100 mols of acetic acid containing up to 20 weight percent water at a temperature of 10° to 30° C., whereby a crude reaction product mixture including the dichloride, the chlorohydrin acetate, and the diacetate of the olefin is produced, hydrolyzing said mixture at a temperature of 200° to 250° C. in the presence of at least 2 mols of sodium acetate per mol of olefin charged to the chlorination zone, and in the presence of an organic cosolvent selected from the group consisting of acetone, dioxane, methylethylketone, and tetrahydrofuran, said cosolvent containing about 10 to 50 volume percent water, and recovering the 1,2-glycol.

2. Process according to claim 1, wherein the cosolvent is acetone.

3. Process for preparing a 1,2-glycol having 5 to 20 carbon atoms in the molecule, which comprises reacting at a temperature of 10° to 30° C. approximately equimolecular quantities of chlorine and a 1-olefin of 5 to 20 carbon atoms in the presence of an acetate ion-donating medium comprising 1 to 7 mols of sodium acetate per mol of olefin, and 10 to 100 mols, per mol of olefin, of acetic acid containing 1 to 15 weight percent of water, to produce a crude reaction product mixture including the dichloride, the chlorohydrin acetate, and the diacetate of the olefin; hydrolyzing said mixture at a temperature of 200° to 250° C. in the presence of at least 2 mols of sodium acetate per mol of olefin charged to the chlorination zone, and in the presence of an organic cosolvent selected from the group consisting of acetone, dioxane, methylethylketone and tetrahydrofuran, said cosolvent containing about 10 to 50 volume percent water; and recovering the 1,2-glycol.

4. Process according to claim 3, wherein the cosolvent is acetone containing 20 to 40 volume percent of water.

5. Process for preparing a 1,2-glycol having 5 to 20 carbon atoms in the molecule, which comprises reacting at a temperature of 10° to 30° C. approximately equimolecular quantities of chlorine and a 1-olefin of 5 to 20 carbon atoms in the presence of an acetate ion-donating medium comprising 1 to 7 mols of sodium acetate per mol of olefin, and 10 to 100 mols, per mol of olefin, of acetic acid containing 1 to 15 weight percent of water, to produce a crude chloroacetoxylated mixture, filtering said mixture to remove sodium chloride therefrom, fractionating the crude mixture to remove acetic acid and water, hydrolyzing the resulting mixture at a temperature of 200° to 250° C. in the presence of at least 2 mols of sodium acetate per mol of olefin charged to the chlorination zone, and in the presence of an organic cosolvent selected from the group consisting of acetone, dioxane, methylethylketone and tetrahydrofuran, said cosolvent containing about 10 to 50 volume percent water, separating the 1,2-glycol, acetic acid and sodium acetate from the products of hydrolysis, recovering the 1,2-glycol, and returning sodium acetate and acetic acid to the chlorination zone.

6. Process according to claim 5, wherein the cosolvent is acetone.

References Cited in the file of this patent

UNITED STATES PATENTS 1,259,758    McElroy _____ Mar. 19, 1918
2,318,032    Van De Griendt et al. ___ May 4, 1943

FOREIGN PATENTS 697,171    France _____ Jan. 13, 1931

OTHER REFERENCES

Titov et al.: J. General Chemistry (U.S.S.R.), vol. 25, pages 709–11 (1955); English translation.